(No Model.)
J. G. SHERMAN.
FARM GATE.
No. 325,123. Patented Aug. 25, 1885.
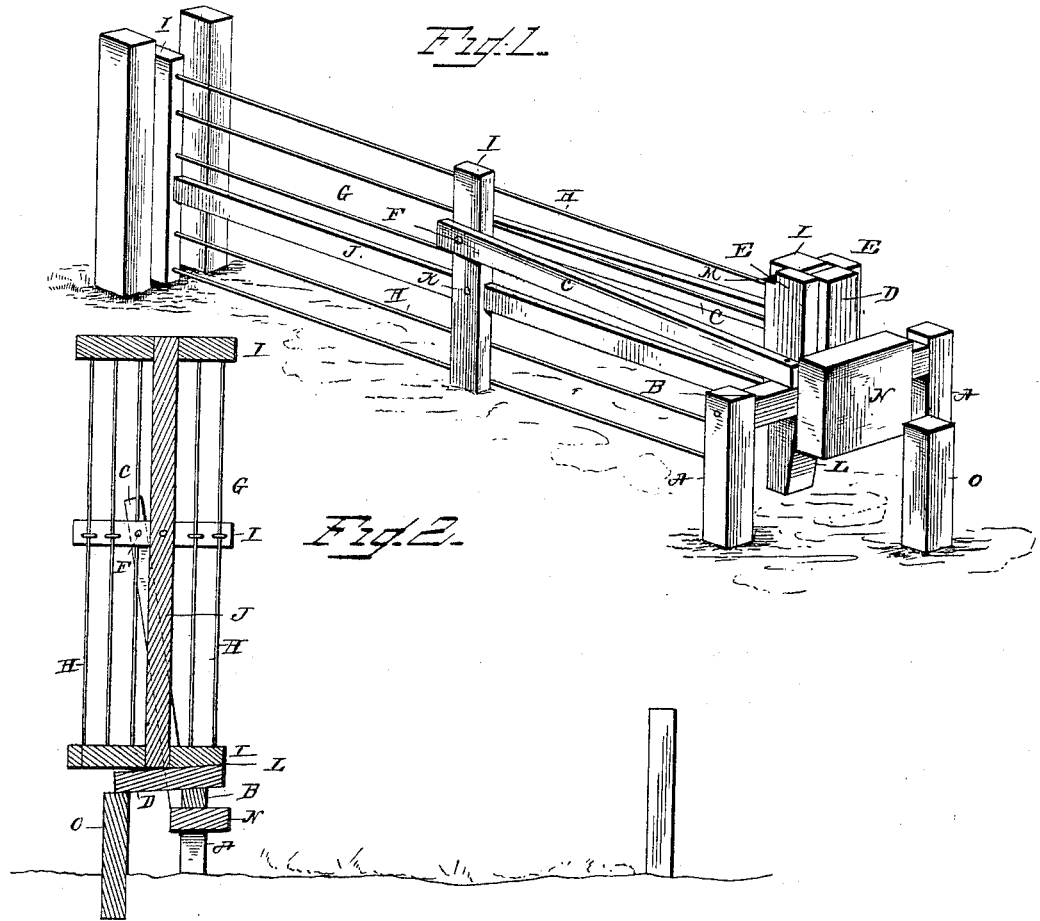
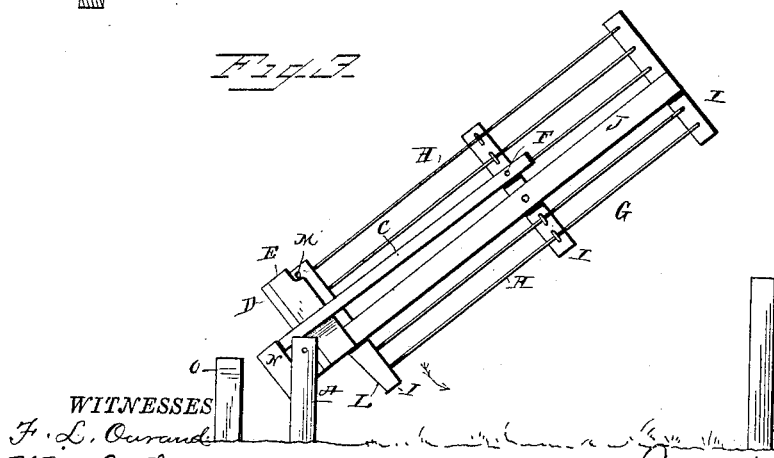
WITNESSES
F. L. Ourand
Wm. J. Littell
INVENTOR
Jeremiah G. Sherman,
by J. R. Littell,
Attorney

UNITED STATES PATENT OFFICE.

JEREMIAH G. SHERMAN, OF WEST McHENRY, ILLINOIS.

FARM-GATE.

SPECIFICATION forming part of Letters Patent No. 325,123, dated August 25, 1885.

Application filed April 14, 1885. (No model.)

*To all whom it may concern:*

Be it known that I, JEREMIAH G. SHERMAN, of West McHenry, in the county of McHenry and State of Illinois, have invented certain new and useful Improvements in Farm-Gates, of which the following is a specification.

Figure 1 is a perspective view showing my improved gate in a closed position. Fig. 2 is a longitudinal sectional view showing the gate open, and Fig. 3 is a side view showing the gate in the act of being closed.

The same letters refer to the same parts in all the figures.

This invention relates to that class of gates which are known as "tilting gates," and it has for its object to produce a gate of this class which shall be simple in construction, easily operated, and which shall be self-locking or self-sustaining in either an open or a closed position.

With these ends in view the invention consists in the improved construction and arrangement of the constituent parts of the said gate which will be hereinafter fully described, and particularly pointed out in the claims.

In the drawings hereto annexed, A A designate the gate-posts, which are provided with bearings for a transverse shaft, B, having a pair of laterally-extending converging arms, C C, the inner ends of which are attached to the shaft B, at the sides of an upright, D, having vertical flanges E E. The outer or converging ends of the arms C C are connected by a pin, F, on which the gate G is pivotally mounted. The said gate is constructed of a suitable frame-work, in which wires H, preferably barbed wires, are strung horizontally, as shown. By this method of construction, the essential requisites of lightness, cheapness, and durability are attained.

As will be seen in the drawings, the framework of the gate comprises in its construction a series of vertical braces or uprights, I I, connected by a central or longitudinal bar, J. The said gate is mounted pivotally between the converging outer ends of the arms C C, by means of the pin or shaft F passing through one of the vertical bars at a point nearer the outer than the inner end of the gate, the inner end of which will, therefore, slightly overbalance its outer end. The edge of the innermost brace I of the gate is beveled, as shown at L, so as to permit the gate to have a slight swinging motion upon its pivot F. Pins M M, extending laterally from the said brace I, and adapted to bear against the upper and lower ends, respectively, of the flanges E of upright D, serve to limit the swinging motion of the gate upon its pivot F.

Suitably secured to the outer or rear side of the shaft B is a weight, N, serving to balance the gate.

O represents a post arranged in close proximity to the gate-posts A A, as shown, and upon which the upright D is adapted to rest when the gate is in open position, said post serving as a stop.

From the foregoing description, taken in connection with the drawings hereto annexed, the operation and advantages of this invention will be readily understood.

The construction is exceedingly simple and inexpensive. To open the gate, it is only necessary to raise or lift it to the position shown in Fig. 2 of the drawings, which may be easily done, the weight of the gate being counterbalanced by the weight N. As the gate swings open it will also swing upon the pivot F, causing its inner portion to swing in the direction indicated by an arrow until the beveled portion L of the inner post I will rest upon the upright D, between the flanges E E. The gate will thus, by its own weight, be sustained in an upright or open position. When the gate is lowered or closed, its inner end will, by its own weight, swing back to the position shown in Fig. 1 of the drawings.

It will be readily seen that snow or similar obstructions upon the ground will in no wise interfere with the successful operation of my improved gate; also, that the latter is self-sustaining when adjusted to either an open or a closed position.

Having thus described my invention, I claim and desire to secure by Letters Patent of the United States—

1. In a gate, the combination, with a pair of posts, of a bar or shaft mounted pivotally in the upper ends of the same, arms secured to said shaft and extending inwardly therefrom, a suitably-constructed gate pivoted midway its ends between the outer ends of said arms, and a weight, N, attached to the shaft B, substantially as set forth.

2. In a gate, the combination of a pair of posts or uprights, a bar or rock-shaft journaled transversely in the upper ends of said posts and provided with laterally-extending converging arms and with a flanged upright, and a suitably-constructed gate mounted pivotally between the outer ends of the said arms, and having a beveled post or brace at its inner end, substantially as and for the purpose set forth.

3. The combination of a rock-shaft having a pair of converging arms and a flanged upright with a gate pivoted between the outer ends of said converging arms and provided at its inner end, which overbalances the outer end, with laterally-projecting pins or studs forming stops adapted to engage the flanges of the upright upon the rock-shaft, substantially as and for the purpose set forth.

4. The combination of posts or supports, a rock-shaft having a pair of laterally-extending converging arms, and a flanged upright, a gate pivoted between the outer ends of the said converging arms, the rear or inner end of said gate overbalancing its outer end, and a counter-weight upon the outer side of the rock-shaft, all arranged and operating substantially as and for the purpose herein shown and specified.

In testimony whereof I affix my signature in presence of two witnesses.

JEREMIAH G. SHERMAN.

Witnesses:
JAMES B. PERRY,
GEO. W. OWEN.